(12) United States Patent
Sridharan et al.

(10) Patent No.: US 12,301,499 B2
(45) Date of Patent: May 13, 2025

(54) REFERENCE SIGNAL USE ACROSS PHYSICAL CHANNELS IN WIRELESS COMMUNICATIONS

(71) Applicant: QUALCOMM Incorporated, San Diego, CA (US)

(72) Inventors: Gokul Sridharan, Sunnyvale, CA (US); Hung Dinh Ly, San Diego, CA (US); Huilin Xu, Temecula, CA (US); Alexandros Manolakos, Escondido, CA (US); Yi Huang, San Diego, CA (US); Wei Yang, San Diego, CA (US); Yuwei Ren, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 172 days.

(21) Appl. No.: 17/793,526

(22) PCT Filed: Feb. 14, 2020

(86) PCT No.: PCT/CN2020/075304
§ 371 (c)(1),
(2) Date: Jul. 18, 2022

(87) PCT Pub. No.: WO2021/159477
PCT Pub. Date: Aug. 19, 2021

(65) Prior Publication Data
US 2023/0072214 A1 Mar. 9, 2023

(51) Int. Cl.
*H04L 5/00* (2006.01)

(52) U.S. Cl.
CPC ............ *H04L 5/0051* (2013.01); *H04L 5/006* (2013.01)

(58) Field of Classification Search
CPC ..... H04L 5/0051; H04L 5/006; H04L 5/0023; H04L 5/0044; H04L 5/0053; H04L 5/0091
See application file for complete search history.

(56) References Cited

U.S. PATENT DOCUMENTS

| | | | |
|---|---|---|---|
| 9,307,535 B1* | 4/2016 | Singh | ................. H04W 52/346 |
| 2015/0003356 A1* | 1/2015 | Seo | ....................... H04L 5/0058 370/329 |

(Continued)

FOREIGN PATENT DOCUMENTS

| | | |
|---|---|---|
| CN | 104604166 A | 5/2015 |
| CN | 109120388 A | 1/2019 |

(Continued)

OTHER PUBLICATIONS

Dahlman E., et al., "5G NR The Next Generation Wireless Access Technology", Aug. 17, 2018, 400 Pages, XP055775576, p. 197-p. 210, Chapter 16, figure 16.1.

(Continued)

*Primary Examiner* — Ajit Patel
*Assistant Examiner* — Wilfred Thomas
(74) *Attorney, Agent, or Firm* — Arent Fox, LLP

(57) ABSTRACT

User Equipment (UE) receives, from a base station (BS), at least one resource block (RB). The RB includes at least one reference signal (RS) resource element (RE) of a first physical channel of the UE. The UE estimates a channel quality of a second physical channel of the UE as a function of the at least one RS RE. In some examples, the BS associates the transmission of a first physical channel reference signal (RS) and the transmission of a second physical channel RS. The BS then signals, BS to the UE, the association between the first physical channel reference signal and the second physical channel reference signal.

28 Claims, 15 Drawing Sheets

(56) References Cited

U.S. PATENT DOCUMENTS

| | | | |
|---|---|---|---|
| 2015/0078271 A1 | 3/2015 | Kim et al. | |
| 2016/0337993 A1* | 11/2016 | Takeda | H04J 3/06 |
| 2017/0324462 A1* | 11/2017 | Chen | H04B 7/0868 |
| 2019/0182007 A1* | 6/2019 | Liu | H04L 5/0048 |
| 2019/0260532 A1 | 8/2019 | Manolakos et al. | |
| 2021/0075577 A1* | 3/2021 | Zhang | H04L 5/0094 |
| 2021/0314917 A1* | 10/2021 | Lee | H04W 72/02 |
| 2023/0189261 A1* | 6/2023 | Matsumura | H04W 72/1273 370/329 |
| 2024/0031067 A1* | 1/2024 | Gao | H04L 1/08 |

FOREIGN PATENT DOCUMENTS

| | | | |
|---|---|---|---|
| WO | 2018089115 A1 | 5/2018 | |
| WO | 2018128975 A1 | 7/2018 | |
| WO | 2019161181 A1 | 8/2019 | |

OTHER PUBLICATIONS

Supplementary European Search Report—EP20918389—Search Authority—The Hague—Oct. 19, 2023.
China Telecom: "Summary of Phase 2 Email Discussion on NR Coverage Enhancement," 3GPP TSG RAN Meeting #86, RP-192562, Dec. 9-12, 2019 (Dec. 12, 2019) the whole document, 19 pages.
International Search Report and Written Opinion—PCT/CN2020/075304—ISA/EPO—Nov. 18, 2020.

\* cited by examiner

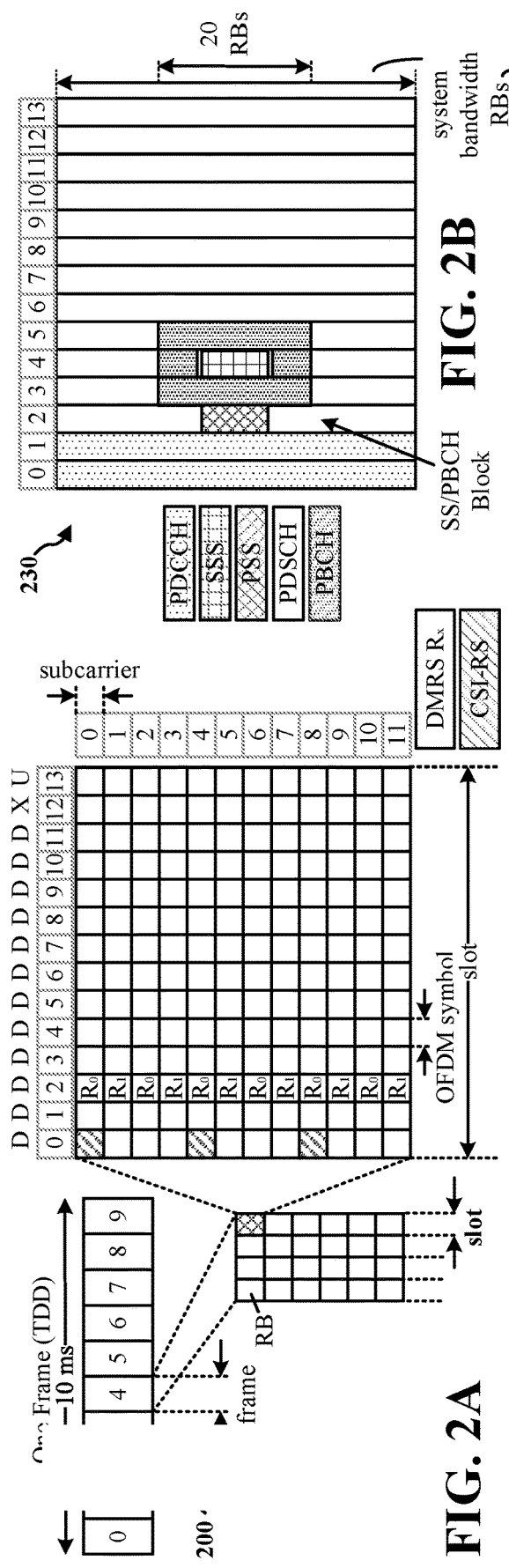
FIG. 2A
FIG. 2B
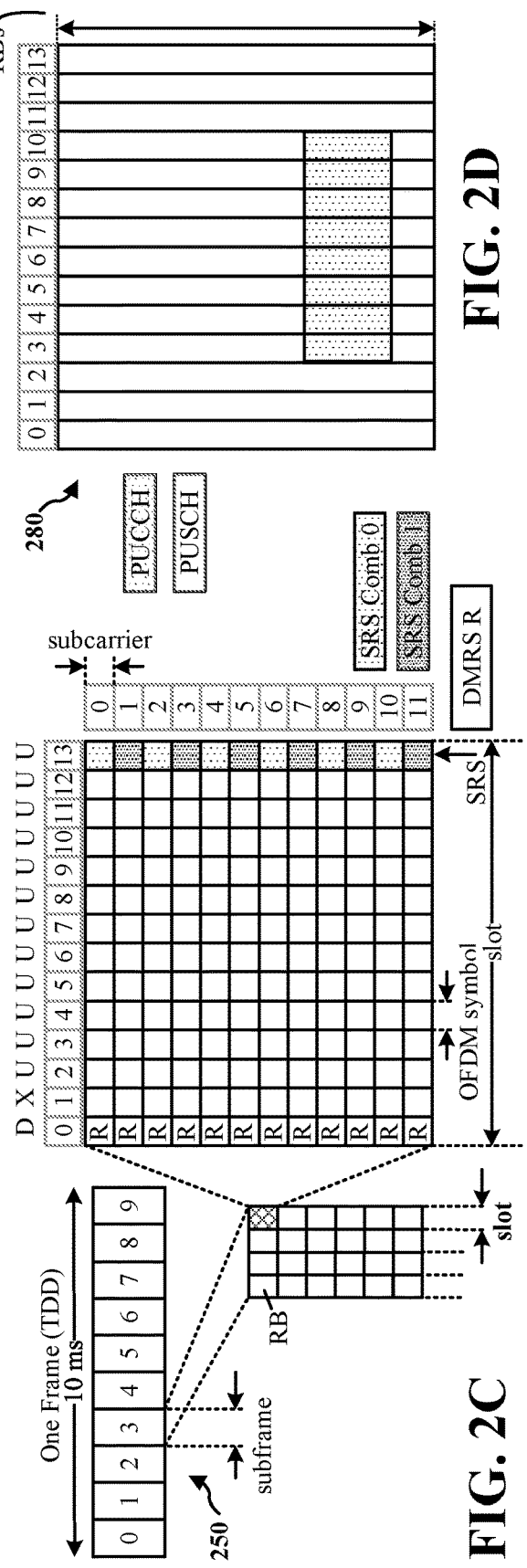
FIG. 2C
FIG. 2D

REFERENCE SIGNAL USE ACROSS PHYSICAL CHANNELS IN WIRELESS COMMUNICATIONS

This application is a 35 U.S.C. § 371 National Phase of PCT Application No. PCT/CN2020/075304, entitled "REFERENCE SIGNAL USE ACROSS PHYSICAL CHANNELS IN WIRELESS COMMUNICATIONS" filed on Feb. 14, 2020, which is hereby incorporated by reference in its entirety.

BACKGROUND

Technical Field

The present disclosure relates generally to communication systems, and more particularly in some examples, to the use of reference signals across physical channels to aid in channel quality estimation and demodulation within a given channel.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The technology disclosed herein includes methods, apparatuses, and computer readable media for reference signal use across physical channels in wireless communications. In some examples, a User Equipment (UE) receives, from a base station (BS), at least one resource block (RB). The RB includes at least one reference signal (RS) resource element (RE) of a first physical channel of the UE. The UE estimates a channel quality of a second physical channel of the UE as a function of the at least one RS RE. In some examples, the BS associates the transmission of a first physical channel reference signal (RS) and the transmission of a second physical channel RS. The BS then signals, BS to the UE, the association between the first physical channel reference signal and the second physical channel reference signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
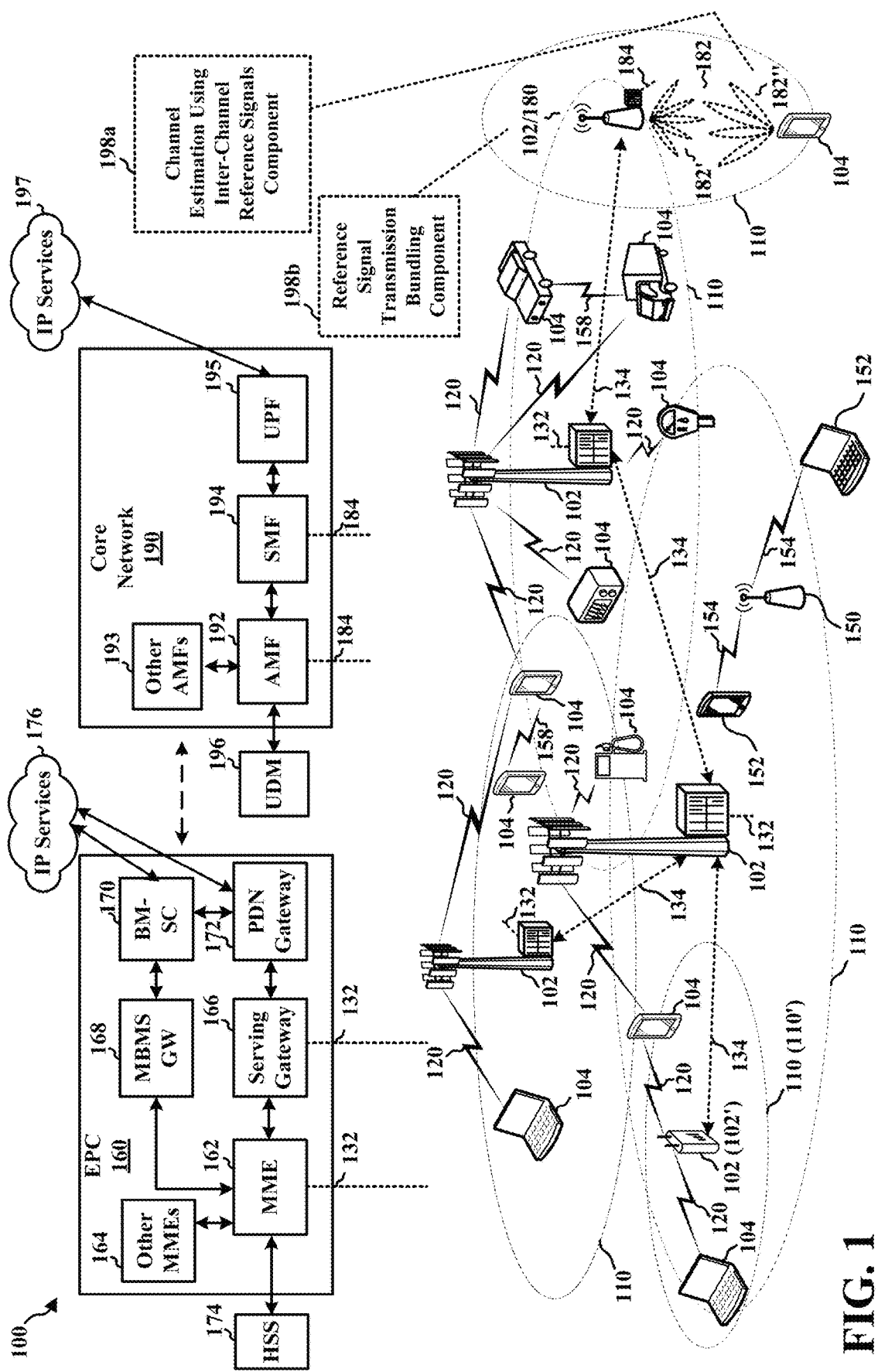
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In 5G NR wireless communications networks, a user equipment (UE) may use reference signals (RSs) in a given downlink physical channel from a network base station to characterize that physical channel. The UE may then use such characterizations, known as "channel estimation" or "channel response," to assist in demodulating information contained in that physical channel. Additional RSs within a given physical channel, while helpful in improving the quality of the channel estimation (and consequently assisting in reliably decoding the information contained in the channel) introduce overhead and reduce the symbols available for data transmission.

In aspects of the present disclosure, methods, non-transitory computer readable media, and apparatuses are provided. In some examples of the technology disclosed herein, a UE (a receiving apparatus in the downlink) and a base station (a transmitting apparatus in the downlink) may cooperate to enable the UE to use a reference signal of a first downlink physical channel, e.g., a Physical Downlink Control Channel (PDCCH), to estimate the channel quality of a second downlink physical channel, e.g., e.g., a Physical Downlink Shared Channel (PDSCH). The base station may configure the first channel and second channel to support such use, and may signal to the UE that the first channel supports such use. The configuration may be in response to the UE signaling that is capable of such use. The UE may use the resulting channel quality estimate to demodulate information on the second channel. The UE may use the resulting channel quality estimate to demodulate information in the second channel under challenging conditions, for example, low signal-to-noise ratio on the second channel, without the introduction of an additional reference signal in the second channel.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors.

Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 184 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform channel estimation for a physical channel using inter-channel reference signals 198a. In such channel estimation 198a, in a given slot of a downlink frame from a base station 180, the UE 104 receives at least one resource element (RE) containing a first physical channel reference signal (RS). The UE 104 then estimates the channel quality of a second physical channel of the downlink using the RS RE of the first channel along with using the second channel RS REs. In some aspects, the UE may receive by the UE, an indication that transmission similarity between a port used to transmit the first physical channel and a port used to transmit the second physical channel supports estimating the channel quality of the second physical channel as a function of the at least one RS RE of the first physical channel. In such aspects the UE 104 performs channel estimation using the first channel RS RE(s) upon receiving the indication. In some aspects, the UE may signal to the base station 180 that the UE 104 is capable of estimating channel quality of a second physical channel of the UE 104 as a function of the at least one RS RE of the first physical channel. In some such embodiments, the base station transmits the indication in response to the signaling.

Continuing to refer to FIG. 1, in certain aspects, the base station 180 may be configured to bundle reference signal channels for transmission 198b in a way that facilitates the UE 104 to perform channel estimation for a physical channel using cross-reference signals. In such bundling, the base station 180 associates transmission of the first physical channel RS and a second physical channel RS, and then signals, to the UE 104, the association between the first physical channel reference signal and the second physical channel reference signal. In some such embodiments, the base station 180 performs the association by configuring the first physical channel and the second physical channel as RB-contiguous in at least one of time and frequency. In some such embodiments, the base station 180 performs the association by configuring the first physical channel and the second physical channel to transmit over ports with substantially equal transmission beams and power levels. Combinations of these approaches to associating the physical channels containing separate reference signals may be used, and other characteristics of the transmission across the physical channels may be controlled—providing a similar transmission baseline across the channels. In other aspects, the base station 180 also signals one or both of the duration of the association and the base station transmission port pairings of the first and second channels. In some aspects, the base station 180 signals RS bundling via at least one of Download Control Information (DCI), Media Access Control-Control Element (MAC-CE), and Radio Resource Control (RRC).

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
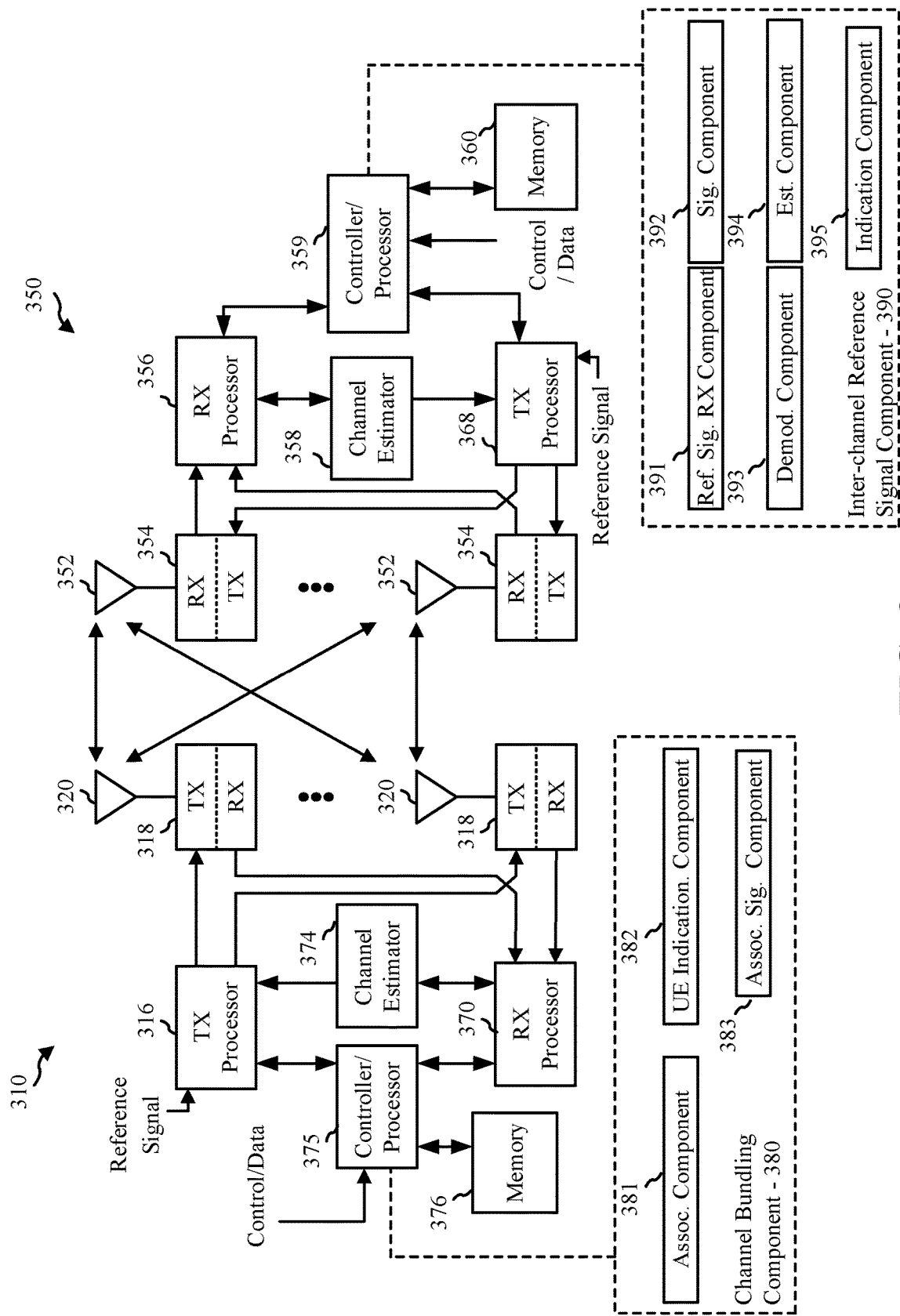
FIG. 3 is a diagram illustrating an base station and user equipment (UE) in an access network, in accordance with example of the technology disclosed herein.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

In some aspects of the present technology, the base station 310 TX processor 316 under the control of the base station 310 Controller/Processor 375 associates transmission of a first physical channel RS and a second physical channel RS to facilitate use of the first physical channel reference signal by a UE 350 for channel quality estimation of the second physical channel. In some aspects of the present technology, the base station 310 RX processor 370 receives, from the UE 350, an indication that the UE 350 is capable of estimating channel quality of a second physical channel of the UE 350 as a function of the at least one RS RE of the first physical channel. In some such aspects, the base station 310 associates transmission of a first physical channel RS and a second physical channel RS upon receiving the indication. In some aspects, the base station signals the association to the UE 350.

As an supplemental explanation, base station 310 aspects of the technology disclosed herein can be view as components providing means performing the function of each particular component. For example, the base station 310 controller/processor 375 can include a Channel Bundling Component 380 operative to bundle physical channels as described above and elsewhere herein. The Channel Bundling Component 380 may include an Associating Component 381 operative to associate transmission of a first physical channel RS and a second physical channel RS to facilitate use of the first physical channel reference signal by a UE 350 for channel quality estimation of the second physical channel. The Channel Bundling Component 380 may include a UE Indication Component 382 operative to receive, from the UE 350, an indication that the UE 350 is capable of estimating channel quality of a second physical channel of the UE 350 as a function of the at least one RS RE of the first physical channel. The Channel Bundling Component 380 may include an Association Signaling Component 383 operative to signals the association build by the Association Component 381 to the UE 350.

While the Controller/Processor 375, TX processor 316, and the RX Processor 370 of the base station 310 are identified herein as performing some aspects of the disclosed technology, such identification is for example purposes only, and performance of these aspects may be allocated to other portions of the base station 310, and even other portions of the network.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements layer 3 and layer 2 functionality.

In some aspects of the present technology, the UE 350 RX processor 356 receives, from the base station 310, at least one resource block including at least one reference signal resource element of a first physical channel of the UE 350. The RX processor 356 also may receive an indication that transmission similarity between the first physical channel and the second physical channel supports estimating the channel quality of the second physical channel as a function of the at least one RS RE of the first physical channel. In some instance the indication is an indication that transmission similarity between a port used to transmit the first physical channel and a port used to transmit the second physical channel supports estimating the channel quality of the second physical channel as a function of the at least one RS RE of the first physical channel The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

In some aspects of the technology disclosed herein, the UE 350 channel estimator 358 estimates the channel quality of the second physical channel of the UE as a function of the at least one RS RE of the first channel. In some aspects demodulation is performed by the UE 350 (for example in the RX Processor 356 as described above), using the estimated channel quality of the second physical channel of the UE as a function of the at least one RS RE of the first channel.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As an supplemental explanation, UE 350 aspects of the technology disclosed herein can be view as components providing means performing the function of each particular component. For example, the US 350 may include an Inter-Channel Reference Signal Component 390. The Inter-Channel Reference Signal Component 390 may include a Reference Signal Receiving Component 391 that receives, from the base station 310, at least one resource block including at least one reference signal resource element of a first physical channel of the UE 350. The Inter-Channel Reference Signal Component 390 may include a Signaling Component 392 that signals to the BS that the UE is capable of estimating channel quality of a second physical channel of the UE as a function of the at least one RS RE of the first physical channel. The Inter-Channel Reference Signal Component 390 may include a Demodulation Component 393 that demodulates incoming data signals using the estimated channel quality of the second physical channel of the UE as a function of the at least one RS RE of the first channel. The Inter-Channel Reference Signal Component 390 may include an Estimation Component 394 that estimates the channel quality of the second physical channel of the UE as a function of the at least one RS RE of the first channel. The Inter-Channel Reference Signal Component 390 may include an Indication Component 395 that receives an indication that transmission similarity between a port used to transmit the first physical channel and a port used to transmit the second physical channel supports estimating the channel quality of the second physical channel as a function of the at least one RS RE of the first physical channel.

While the UE 350 RX processor 356, Channel Estimator 358, TX Processor 370, and Controller/Processor 359 are identified herein as performing some aspects of the disclosed technology, such identification is for example purposes only, and performance of these aspects may be allocated to other portions of UE 350, and even other portions of the network.

In scenarios where a UE is limited by link budget, additional signal processing strategies may be useful to help the UE to decode downlink transmissions. In particular in such scenarios, when the UE is far away from the base station, Signal-to-Noise Ratio (SNR) is low, and channel estimation quality is severely impacted, and the ability to reliably recover the downlink data becomes much harder with poor channel estimation. One way to improve channel estimation is to supply additional reference signals. However, adding more reference signals may lead to larger overhead, with fewer and fewer symbols for data transmission.

The technology disclosed herein may leverage existing reference signals, including those intended for control, to aid data channel estimation to improve the receiver performance under such challenging environments. While the examples in the present disclosure describe what may be referred to as intra-slot reference signal bundling, the concepts disclosed herein are applicable to inter-slot reference signal bundling.

Figure 4:
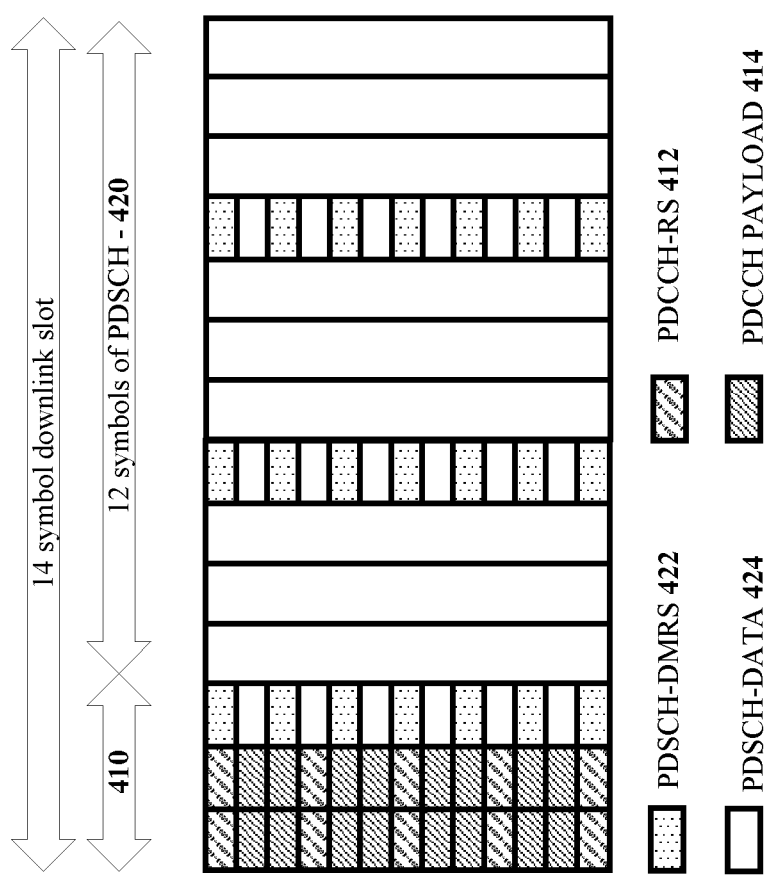
FIG. 4 is a diagram illustrating an a 5G/NR slot in the context of cross-channel reference signal use, in accordance with example of the technology disclosed herein.

Consider, as a continuing example, FIG. 4. illustrating an example 5G/NR slot 400 in the context of inter-channel reference signal use. The slot 400 includes two symbols of control (PDCCH) 410, followed by 12-symbols of PDSCH 420 (three groups of three full symbols of PDSCH data 424, each preceded by one symbol of interleaving PDSCH data 424 and PDSHH-DMRS 422). The three PDSCH-DMRS symbols 422 aid channel estimation for PDSCH-data 424. The PDCCH-RS 412 resource elements in the first two symbols aids channel estimation for PDCCH payload 414. The technology disclosed herein may leverage the PDCCH-RS 430 resource elements for data channel estimation in the PDSCH channel 420. By leveraging the PDCCH-RS 412 resource elements, RSs are spread out over five symbols (instead of just three) may be used for data channel estimation. Note that it is not necessary for the DMRS configuration/pattern to be the same between PDSCH 420 and PDCCH 412 for cross-channel use of reference signals.

Figure 5:
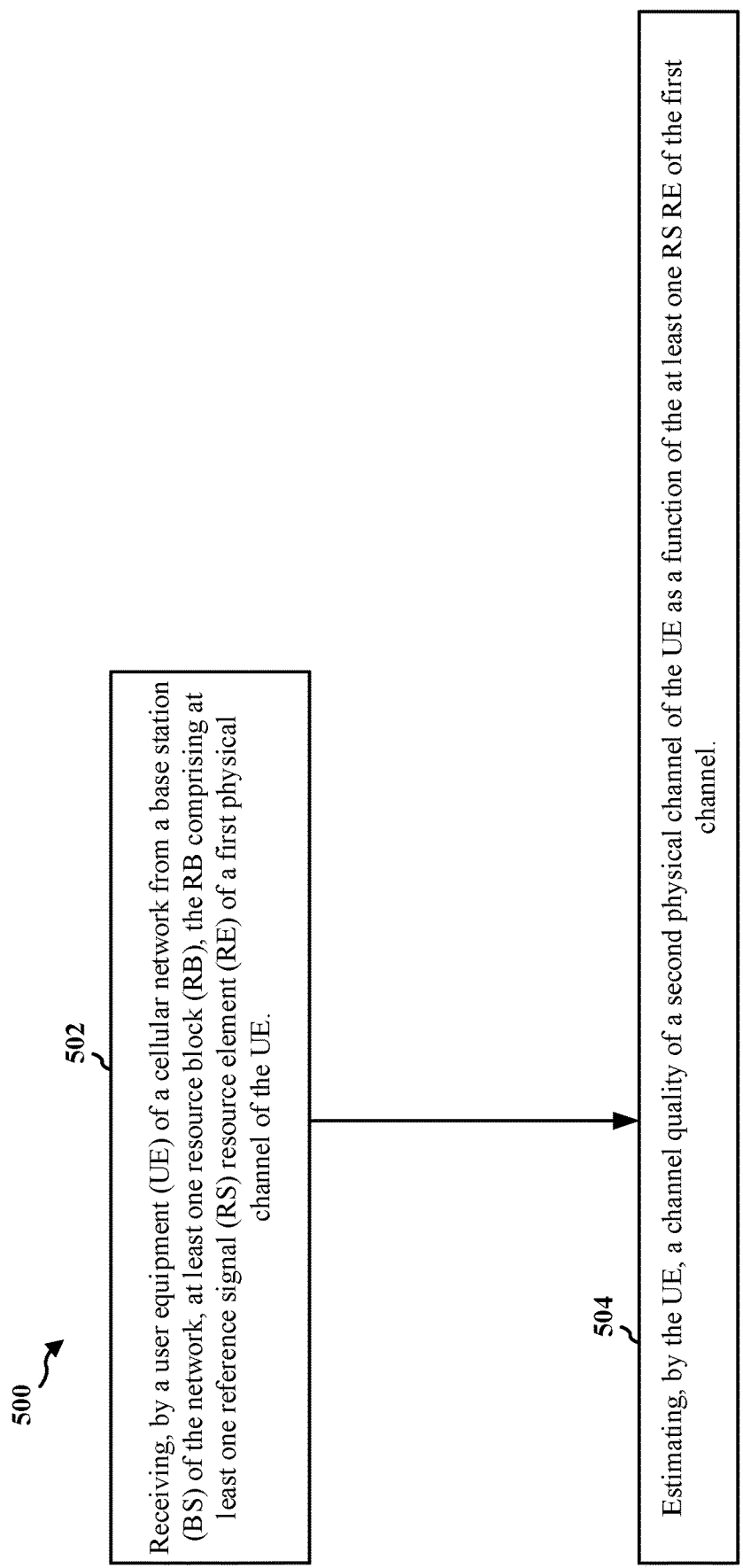
FIG. 5 is a flowchart of a method of wireless communication in accordance with example of the technology disclosed herein.

Referring to FIG. 5, and continuing to refer to prior figures for context, a flowchart of a method 500 of wireless communication is shown, in accordance with examples of the technology disclosed herein. In such methods 500, a UE receives, from a base station, at least one resource block (RB). The RB includes at least one reference signal (RS) resource element (RE) of a first physical channel of the UE—Block 502. In the continuing example, the UE receives one or more 14-symbol downlink slots containing RE for both the PDCCH and PDSCH physical channels as describe in the discussion of FIG. 4.

In some examples, the Reference Signal Receiving Component 391 receives, from the base station 310, at least one resource block including at least one reference signal resource element of a first physical channel of the UE 350. Accordingly, the Reference Signal Receiving Component 391 may provide means for receiving, from the base station 310, at least one resource block including at least one reference signal resource element of a first physical channel of the UE 350.

The UE then estimates a channel quality of a second physical channel of the UE as a function of the at least one RS RE of the first channel—Block 504. In the continuing example, instead of using just the PDSCH DM-RS resource elements (odd subcarriers of the third, seventh, and eleventh symbols of the slot 400), the UE channel estimator 358 performs channel estimation using both the PDSCH DM-RS resource elements and the PDCCH reference signals resource blocks 430 spread out over the first, fourth, seventh, tenth, and thirteenth subcarriers of the first two symbols 410 in the slot 400.

In some examples, the Estimation Component 394 estimates the channel quality of the second physical channel of the UE as a function of the at least one RS RE of the first channel. Accordingly, the Estimation Component 394 may provide means for estimating the channel quality of the second physical channel of the UE as a function of the at least one RS RE of the first channel.

It may not always be possible to leverage PDCCH reference signal resource blocks to aid PDSCH channel estimation. For example, PDSCH transmission may be a MIMO transmission with more than one layer, while PDCCH is always a single layer transmission; PDCCH and PDSCH may be transmitted on a different beams and at different power levels; and it is desirable that PDSCH and PDCCH overlap in frequency (which is not always the case). More generally, PDCCH and PDSCH are defined to be transmitted from a base station over their individual ports. And when signals are transmitted over independent ports, it cannot be guaranteed that they may be leveraged for bundling of reference signals.

While a QCL (quasi co-location) relationship between PDCCH-DMRS and PDSCH-DMRS may exist, the ability to bundle would benefit from additional assurance of coupling of the ports used for the respective transmissions. In some wireless communication networks, base stations may ensure acceptable coupling of ports that enables bundling. In some wireless communication networks, a base station may selectively choose to couple specific ports to help UEs that are far away from base station. The technology disclosed herein include methods, apparatuses, and non-transitory computer readable media for signaling to/from UEs and to/from base stations to request and assert the acceptable coupling of reference signal physical channels and the ability to use cross-channel reference signals to estimate channel quality.

Figure 6:
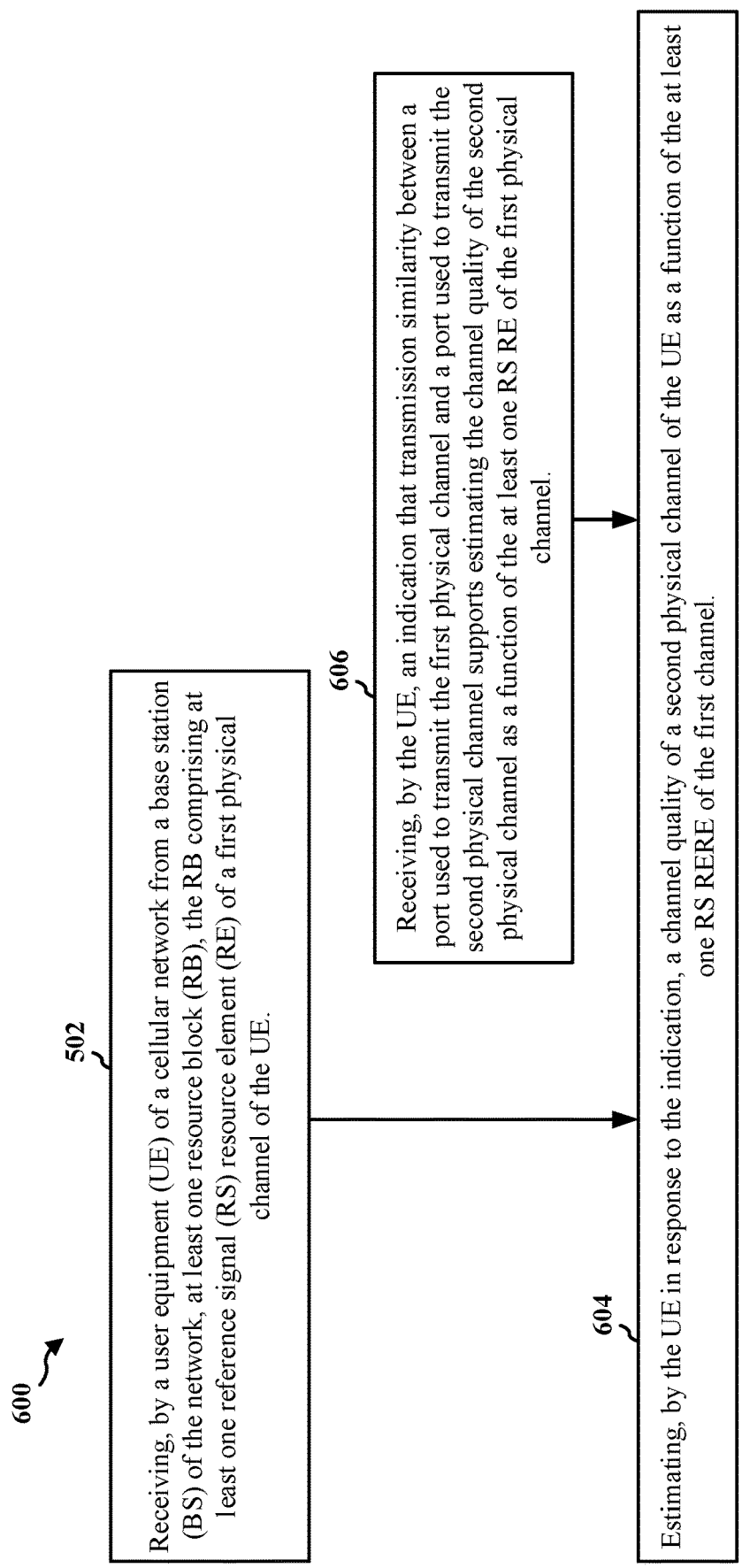
FIG. 6 is a flowchart of a method of wireless communication in accordance with example of the technology disclosed herein.

Referring to FIG. 6, and continuing to refer to prior figures for context, a flowchart of a method 600 of wireless communication is shown, in accordance with examples of the technology disclosed herein. In such methods 600, the UE receives resource blocks containing first channel reference signals as described in connection with Block 502. The UE also receives an indication that transmission similarity between a port used to transmit the first physical channel and a port used to transmit the second physical channel supports estimating the channel quality of the second physical channel as a function of the at least one RS RE of the first physical channel—Block 606. In the example of FIG. 6, the UE performs estimation, Block 604, in response to the indication.

In the continuing example, the UE had received an indication that the PDSCH and PDCCH channels were transmitted such that the UE could reliably combine reference signal resource elements from PDCCH to estimate PDSCH channel quality. Specifically, as part of the Downlink Control Information (DCI) resource elements, the UE received a one bit port association signal set to "1" to indicate that the base station had transmitted PDSCH and PDCCH physical channels such that the UE could reliably combine reference signal resource elements from PDCCH to estimate PDSCH channel quality. While a specific number of bits with a specific meaning for each bit is use in this, and other, examples herein, various number of bits and mappings may be used. Additional signaling between the UE and base station regarding the present technology is discussed below.

In some examples, the Indication Component 395 receives an indication that transmission similarity between a port used to transmit the first physical channel and a port used to transmit the second physical channel supports estimating the channel quality of the second physical channel as a function of the at least one RS RE of the first physical channel. Accordingly, the Indication Component 395 may provide means for receiving an indication that transmission similarity between a port used to transmit the first physical channel and a port used to transmit the second physical channel supports estimating the channel quality of the second physical channel as a function of the at least one RS RE of the first physical channel.

Figure 7:
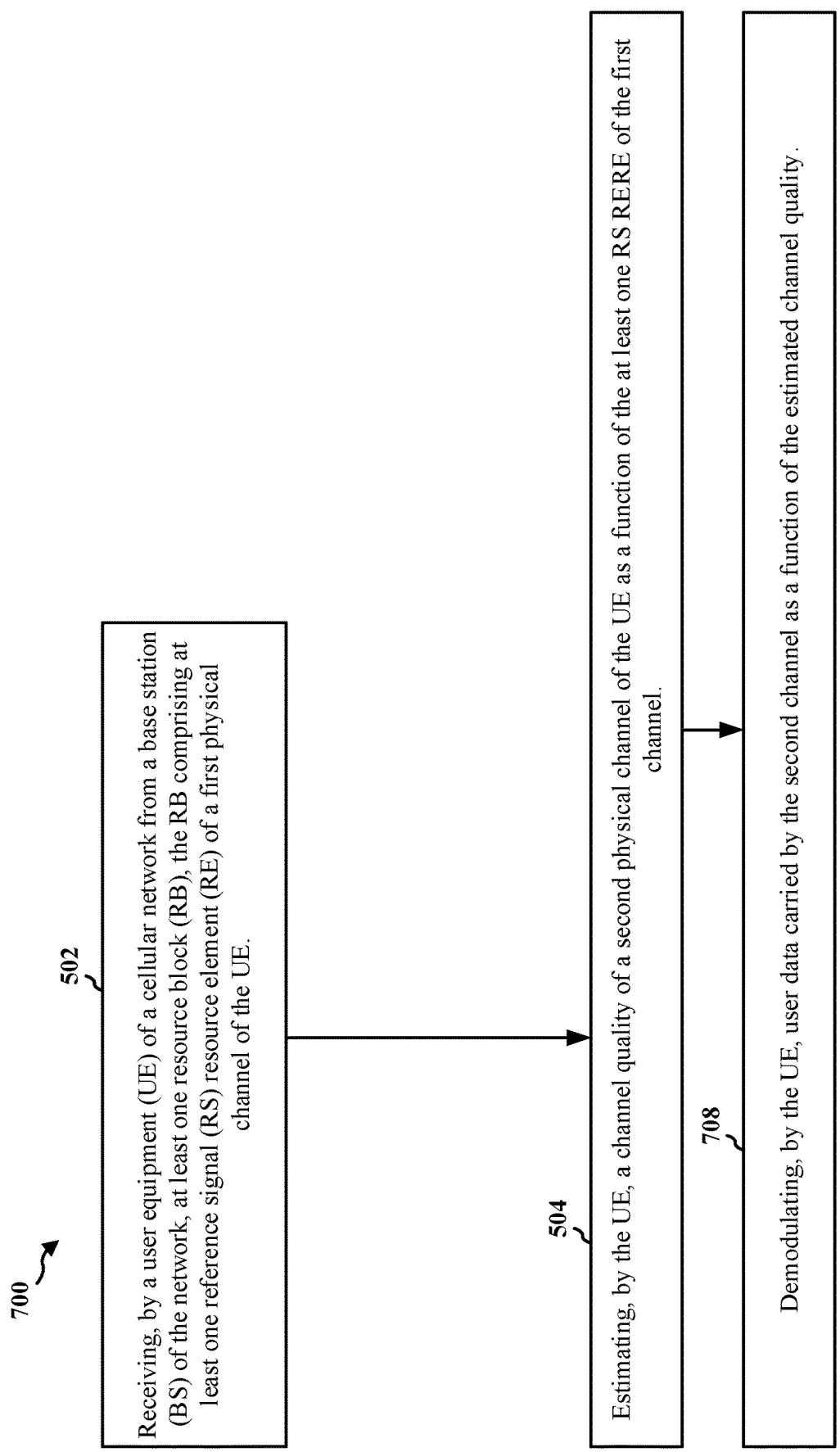
FIG. 7 is a flowchart of a method of wireless communication in accordance with example of the technology disclosed herein.

Referring to FIG. 7, and continuing to refer to prior figures for context, a flowchart of a method 700 of wireless communication is shown, in accordance with examples of the technology disclosed herein. In such methods 700, Block 502 and Block 504 are performed as described above. The UE then uses the estimate of channel quality to demodulate user data carried by the second channel—Block 708. In the continuing example, the UE uses the estimate to demodulate PDSCH user data.

In some examples, the Demodulation Component 393 demodulates incoming data signals using the estimated channel quality of the second physical channel of the UE as a function of the at least one RS RE of the first channel. Accordingly, Demodulation Component 393 may provide means for demodulating incoming data signals using the estimated channel quality of the second physical channel of the UE as a function of the at least one RS RE of the first channel.

Figure 8:
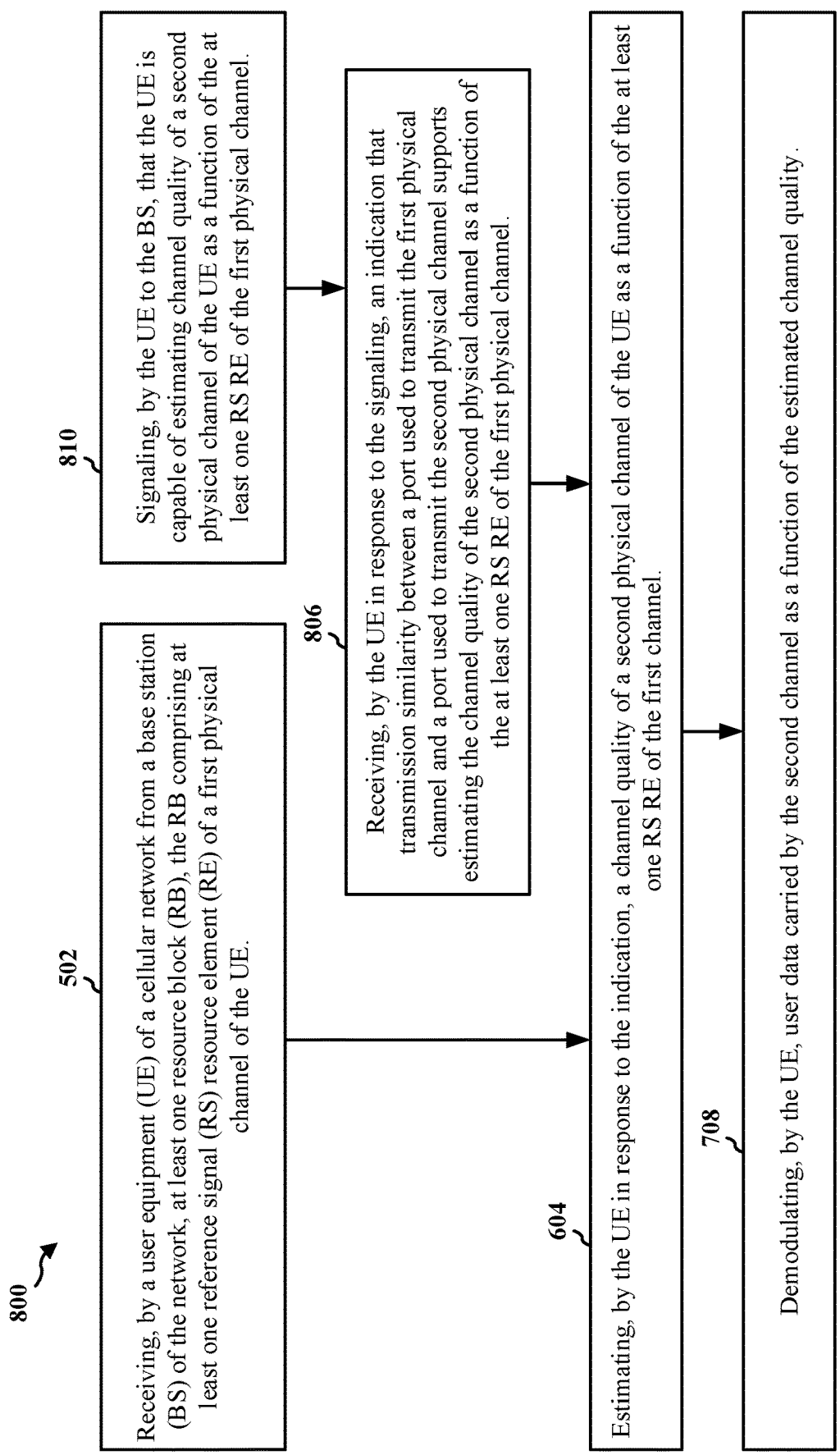
FIG. 8 is a flowchart of a method of wireless communication in accordance with example of the technology disclosed herein.

Referring to FIG. 8, and continuing to refer to prior figures for context, a flowchart of a method 800 of wireless communication is shown, in accordance with examples of the technology disclosed herein. In such methods 800, Block 502, Block 604, and Block 708 are performed as described above. The UE may, prior to receiving an indication that transmission similarity channels supports estimating the channel quality of the second physical channel as a function of reference signals of the first physical channel, signaling, the BS, that the UE is capable of estimating channel quality of a second physical channel as a function of reference signals of the first physical channel—Block 810. In the example of FIG. 8, the UE receives an indication that transmission similarity between the physical channels supports estimating the channel quality of the second physical channel as a function of the at least one RS RE of the first physical channel, in response to the signaling—Block 806.

In some examples, the Signaling Component 392 signals to the BS that the UE is capable of estimating channel quality of a second physical channel of the UE as a function of the at least one RS RE of the first physical channel. Accordingly, the Signaling Component 392 may provide means for signals to the BS that the UE is capable of estimating channel quality of a second physical channel of the UE as a function of the at least one RS RE of the first physical channel.

Figure 9:
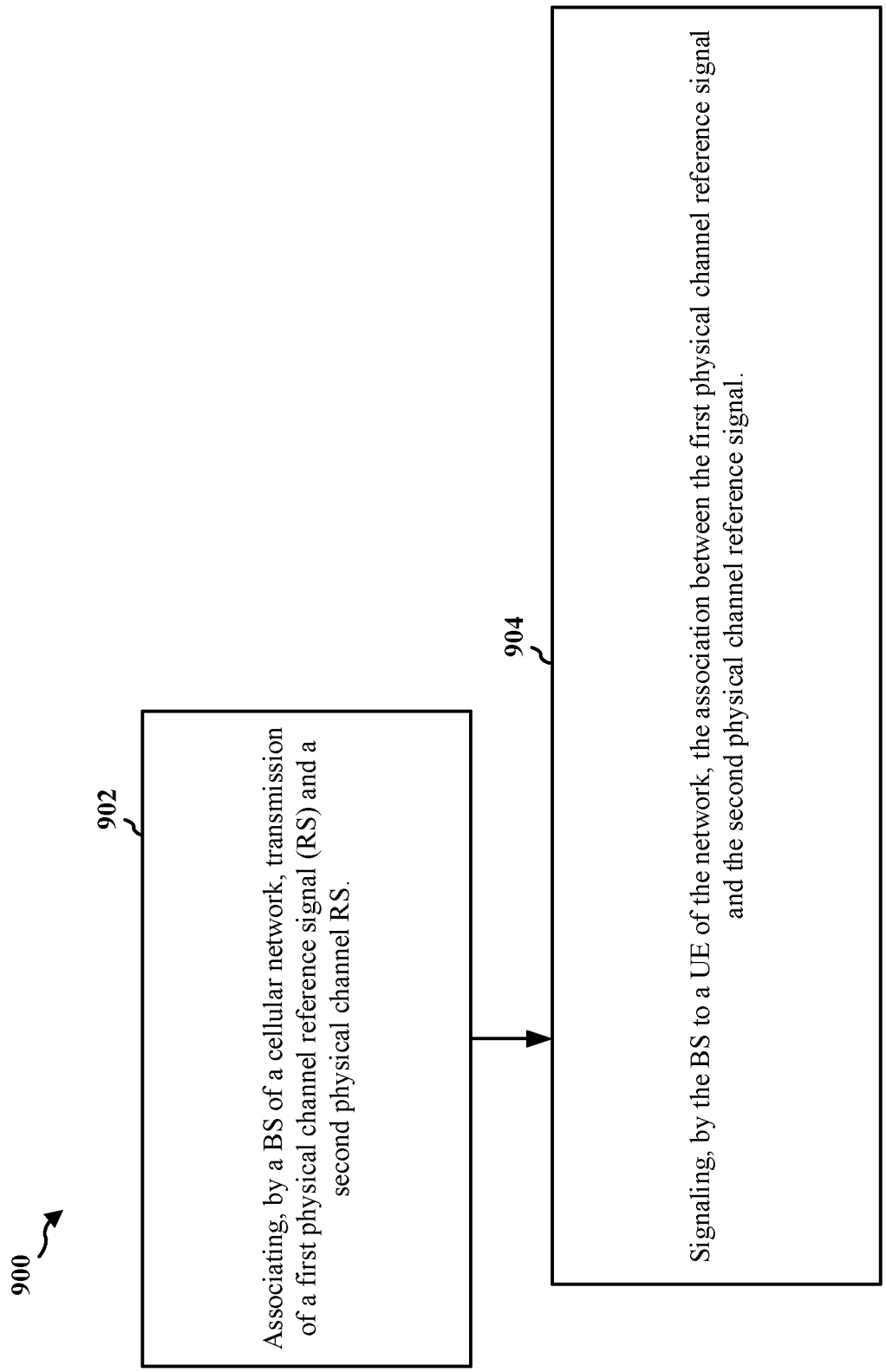
FIG. 9 is a flowchart of a method of wireless communication in accordance with example of the technology disclosed herein.

Referring to FIG. 9, and continuing to refer to prior figures for context, a flowchart of a method 900 of wireless communication is shown, in accordance with examples of the technology disclosed herein—this time from the perspective of a transmitter of the downlink. In such methods 900, a base station of a cellular network associates transmission of a first physical channel reference signal (RS) and a second physical channel RS—Block 902. The base station then signals, to a UE of the network, the association between the first physical channel reference signal and the second physical channel reference signal—Block 904. In the continuing example, the base station is able to create an association between the channel carrying PDCCH DM-RS and the channel carrying the PDSCH reference signal. Using DCI signaling, the base station sets a Port Association bit to "1" to indicate that transmission port bundling is enabled.

In some examples, the Associating Component 381 is operative to associate transmission of a first physical channel RS and a second physical channel RS to facilitate use of the first physical channel reference signal by a UE 350 for channel quality estimation of the second physical channel. Accordingly, Associating Component 381 may provide means for associating transmission of a first physical channel RS and a second physical channel RS to facilitate use of the first physical channel reference signal by a UE 350 for channel quality estimation of the second physical channel. Similarly, the Association Signaling Component 383 is operative to signal the association build by the Association Component 381 to the UE 350. Accordingly, Association Signaling Component 383 may provide means for signaling the association build by the Association Component 381 to the UE 350.

Figure 10:
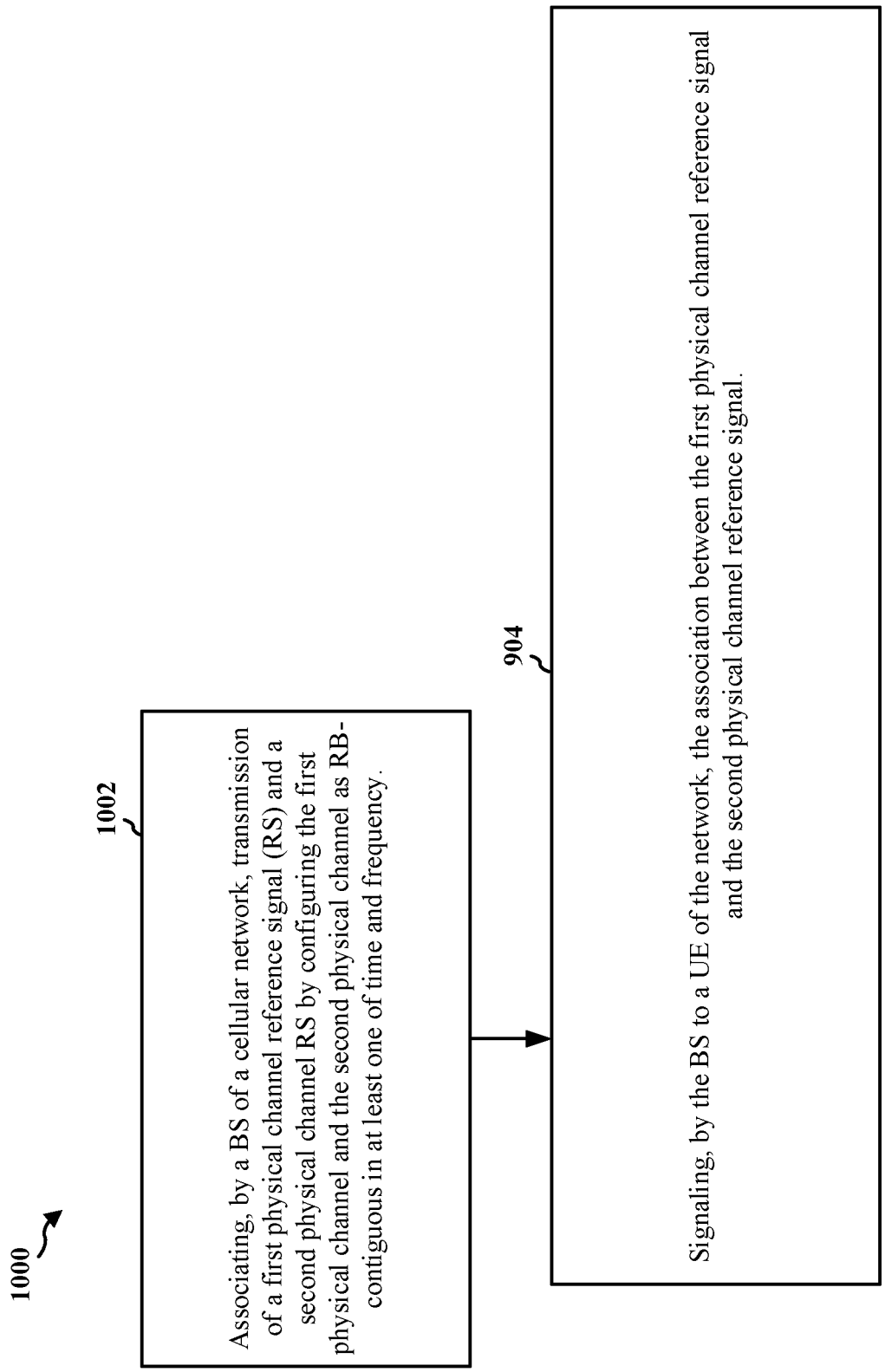
FIG. 10 is a flowchart of a method of wireless communication in accordance with example of the technology disclosed herein.

Referring to FIG. 10, and continuing to refer to prior figures for context, a flowchart of a method 1000 of wireless communication is shown, in accordance with examples of the technology disclosed herein from the perspective of a transmitter of the downlink. In such methods 1000, Block 904 is performed as described above. The base station associates transmission of a first physical channel reference signal (RS) and a second physical channel RS by configuring the first physical channel and the second physical channel as RB-contiguous in at least one of time and frequency—Block 1002. In the continuing example, the base station configures the first physical channel and the second physical channel as RB-contiguous in at least one of time and frequency as explained in conjunction with FIG. 4 above.

In some examples, the Associating Component 381 is operative to associate transmission of a first physical channel RS and a second physical channel RS to facilitate use of the first physical channel reference signal by a UE 350 for channel quality estimation of the second physical channel by configuring the first physical channel and the second physical channel as RB-contiguous in at least one of time and frequency. Accordingly, Associating Component 381 may provide means for associating transmission of a first physical channel RS and a second physical channel RS to facilitate use of the first physical channel reference signal by a UE 350 for channel quality estimation of the second physical channel by configuring the first physical channel and the second physical channel as RB-contiguous in at least one of time and frequency.

Figure 11:
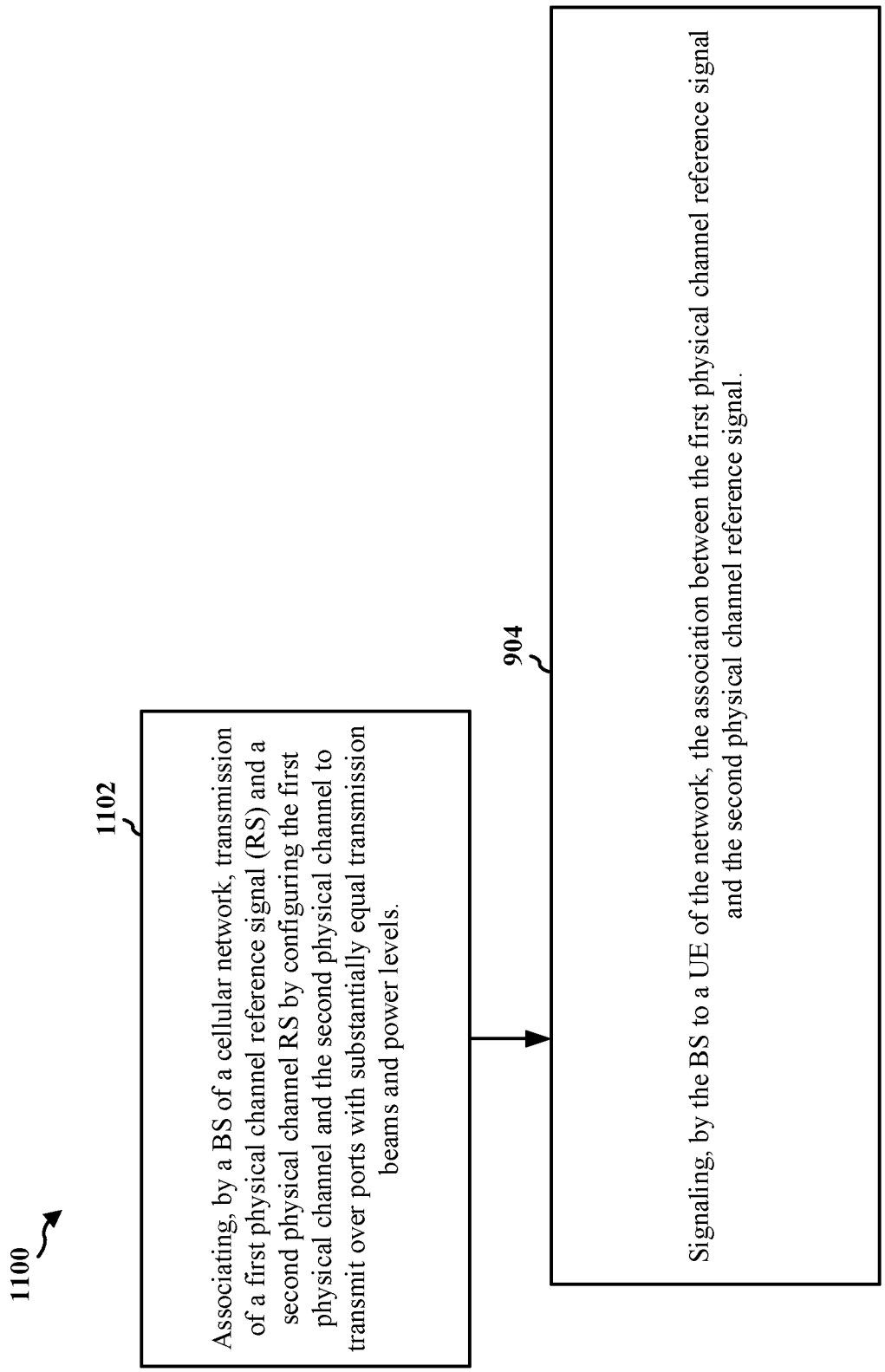
FIG. 11 is a flowchart of a method of wireless communication in accordance with example of the technology disclosed herein.

Referring to FIG. 11, and continuing to refer to prior figures for context, a flowchart of a method 1100 of wireless communication is shown, in accordance with examples of the technology disclosed herein from the perspective of a transmitter of the downlink. In such methods 1100, Block 904 is performed as described above, and the base station TX processor 316 associates transmission of a first physical channel reference signal (RS) and a second physical channel RS by configuring the first physical channel and the second physical channel to transmit over ports with substantially equal transmission beams and power levels—Block 1102. In the continuing example, the base station TX processor 316 configures the first physical channel and the second physical channel to transmit on ports with similar transmission characteristics.

In some examples, the Associating Component 381 is operative to associate transmission of a first physical channel RS and a second physical channel RS to facilitate use of the first physical channel reference signal by a UE 350 for channel quality estimation of the second physical channel by configuring the first physical channel and the second physical channel to transmit over ports with substantially equal transmission beams and power levels. Accordingly, Associating Component 381 may provide means for associating transmission of a first physical channel RS and a second physical channel RS to facilitate use of the first physical channel reference signal by a UE 350 for channel quality estimation of the second physical channel by configuring the first physical channel and the second physical channel to transmit over ports with substantially equal transmission beams and power levels.

Figure 12:
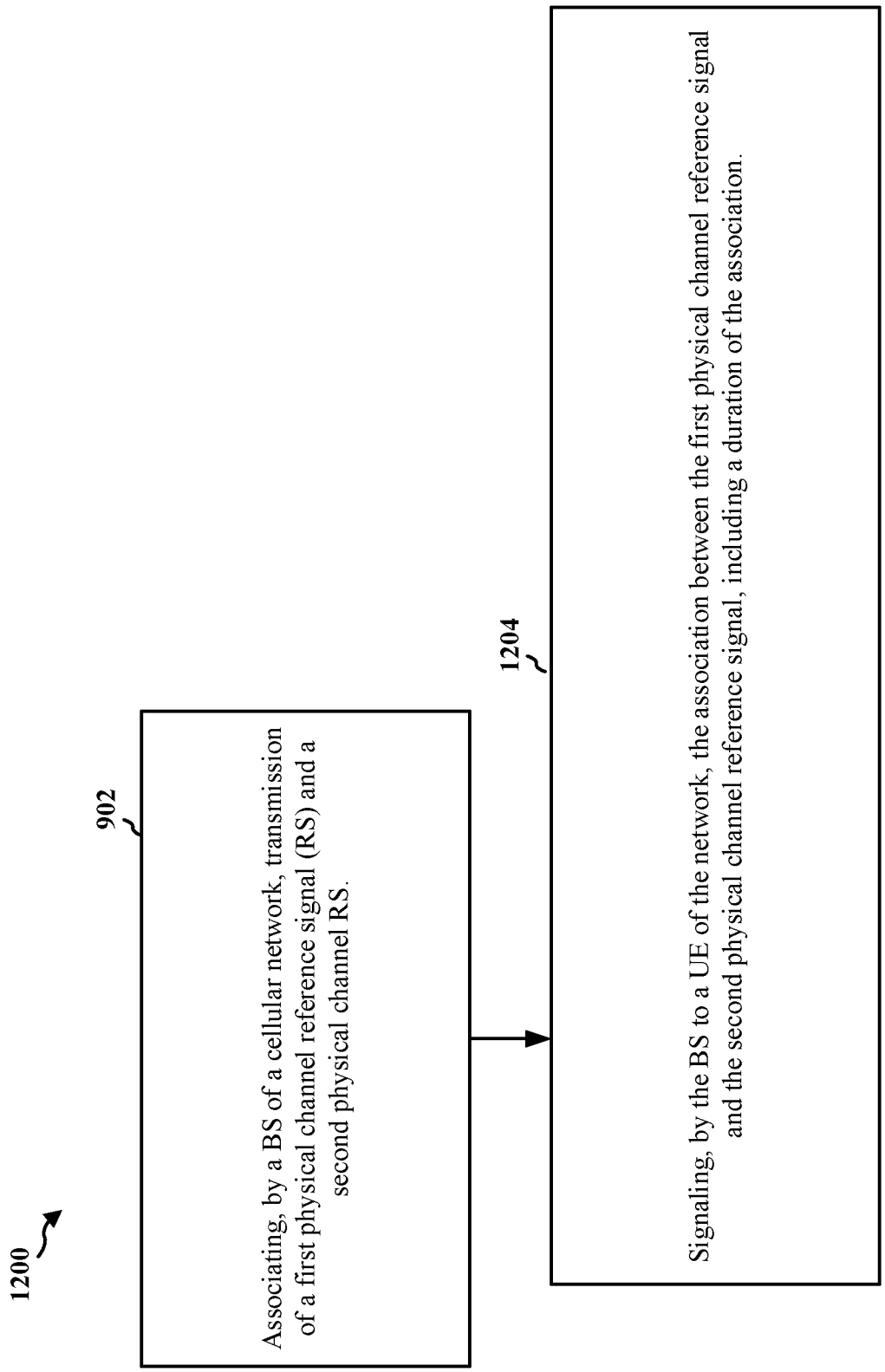
FIG. 12 is a flowchart of a method of wireless communication in accordance with example of the technology disclosed herein.

Referring to FIG. 12, and continuing to refer to prior figures for context, a flowchart of a method 1200 of wireless communication is shown, in accordance with examples of the technology disclosed herein from the perspective of a transmitter of the downlink. In such methods 1200, Block 902 is performed as described above, and the base station TX processor 316 signals, to the UE, the association between the first physical channel reference signal and the second physical channel reference signal, including a duration of the association.—Block 1204. In the continuing example, the base station TX processor 316 configures a two-bit portion of the DCI with the integer number of slots over which the port association will last, e.g., (00) for two slots, (01) for four slots, (10) for six slots, and (11) for eight slots. Many other mappings of the bit pattern (of one or more bits) may be used to indicate the port association duration on a wide variety of units, not just "slots."

Figure 13:
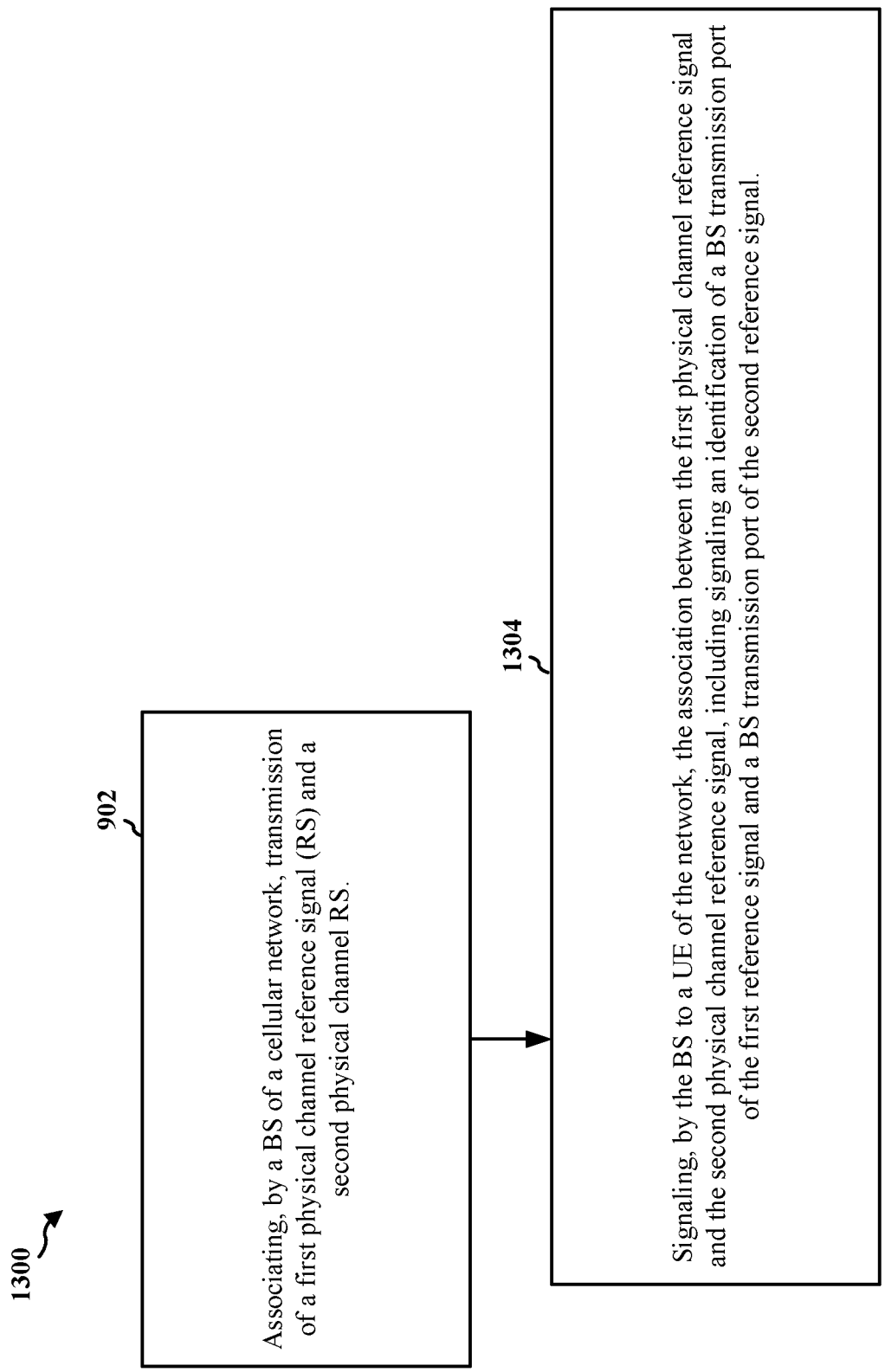
FIG. 13 is a flowchart of a method of wireless communication in accordance with example of the technology disclosed herein.

In some examples, the Association Signaling Component 383 is operative to signal the association built by the Association Component 381 to the UE 350, including a duration of the association. Accordingly, Association Signaling Component 383 may provide means for signaling the association build by the Association Component 381 to the UE 350, including a duration of the association Referring to FIG. 13, and continuing to refer to prior figures for context, a flowchart of a method 1300 of wireless communication is shown, in accordance with examples of the technology disclosed herein from the perspective of a transmitter of the downlink. In such methods 1300, Block 902 is performed as described above, and the base station TX processor 316 signals, to the UE, the association between the first physical channel reference signal and the second physical channel reference signal, including signaling an identification of a BS transmission port of the first reference signal and a BS transmission port of the second reference signal.—Block 1304.

In the continuing example, the base station TX processor 316 configures a two-bit portion of the DCI with the integer number indicating specific base station transmission port pairings, e.g., (00)—PDCCH port #2000, PDSCH-DMRS port #1000); (01)—PDCCH port #2000, PDSCH-DMRS port #1001; (10)—PDCCH port #2000, PDSCH-DMRS port #1002; (11)—PDCCH port #2000, PDSCH port #1003.

In some examples, the Association Signaling Component 383 is operative to signal the association built by the Association Component 381 to the UE 350, including signaling an identification of a BS transmission port of the first reference signal and a BS transmission port of the second reference signal. Accordingly, Association Signaling Component 383 may provide means for signaling the association build by the Association Component 381 to the UE 350, including signaling an identification of a BS transmission port of the first reference signal and a BS transmission port of the second reference signal.

Figure 14:
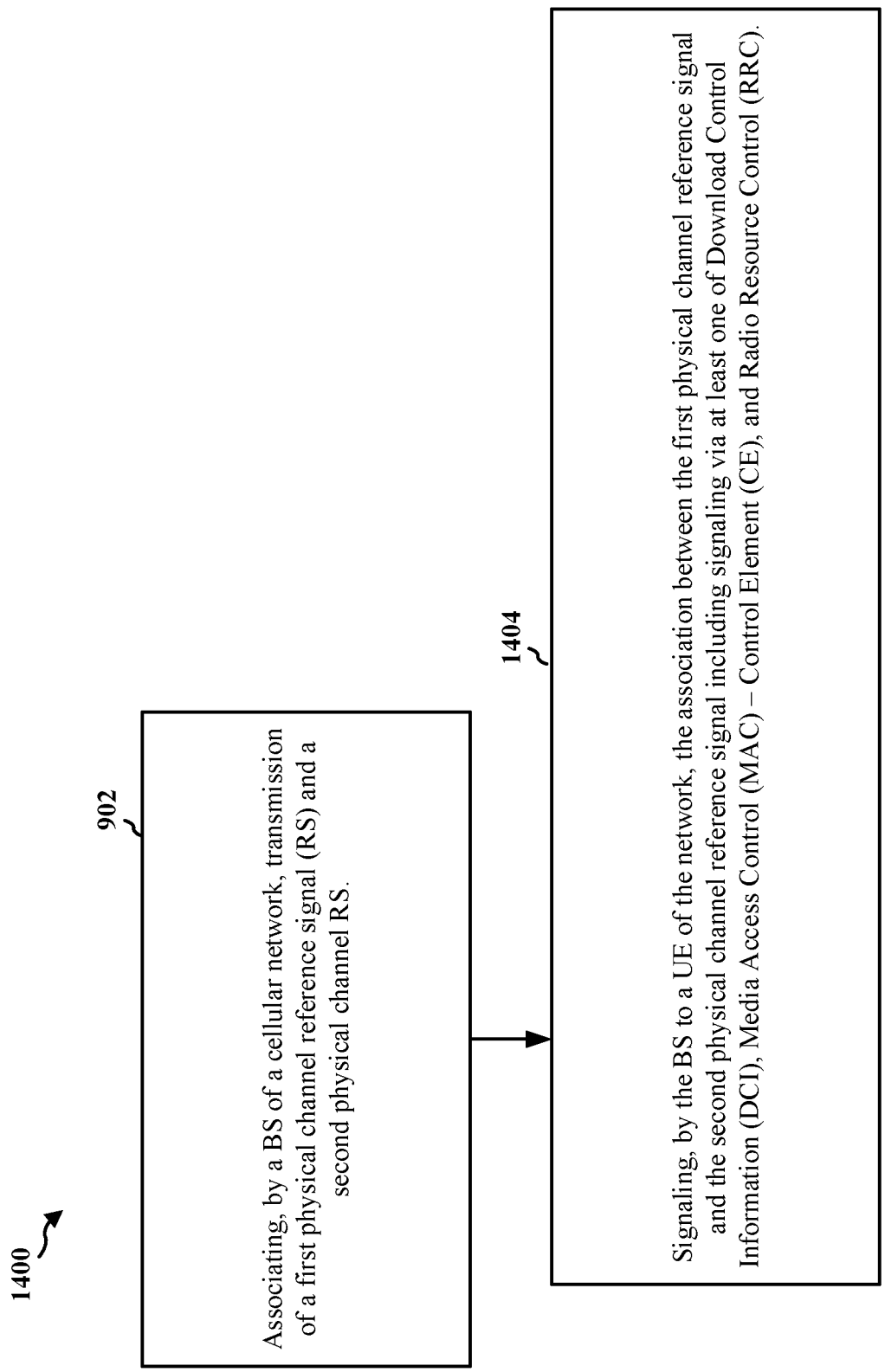
FIG. 14 is a flowchart of a method of wireless communication in accordance with example of the technology disclosed herein.

Referring to FIG. 14, and continuing to refer to prior figures for context, a flowchart of a method 1400 of wireless communication is shown, in accordance with examples of the technology disclosed herein from the perspective of a transmitter of the downlink. In such methods 1400, Block 902 is performed as described above, and the base station TX processor 316 signals, to the UE, the association between the first physical channel reference signal and the second physical channel reference signal via at least one of Download Control Information (DCI), Media Access Control-Control Element (MAC-CE), and Radio Resource Control (RRC).—Block 1404. In the continuing example, the base station TX processor 316 uses the DCI, however, other signaling technology at various levels of the wireless communication network protocol may be used.

In some examples, the Association Signaling Component 383 is operative to signal the association built by the Association Component 381 to the UE 350, via at least one of Download Control Information (DCI), Media Access Control-Control Element (MAC-CE), and Radio Resource Control (RRC). Accordingly, Association Signaling Component 383 may provide means for signaling the association build by the Association Component 381 to the UE 350, via at least one of Download Control Information (DCI), Media Access Control-Control Element (MAC-CE), and Radio Resource Control (RRC).

Figure 15:
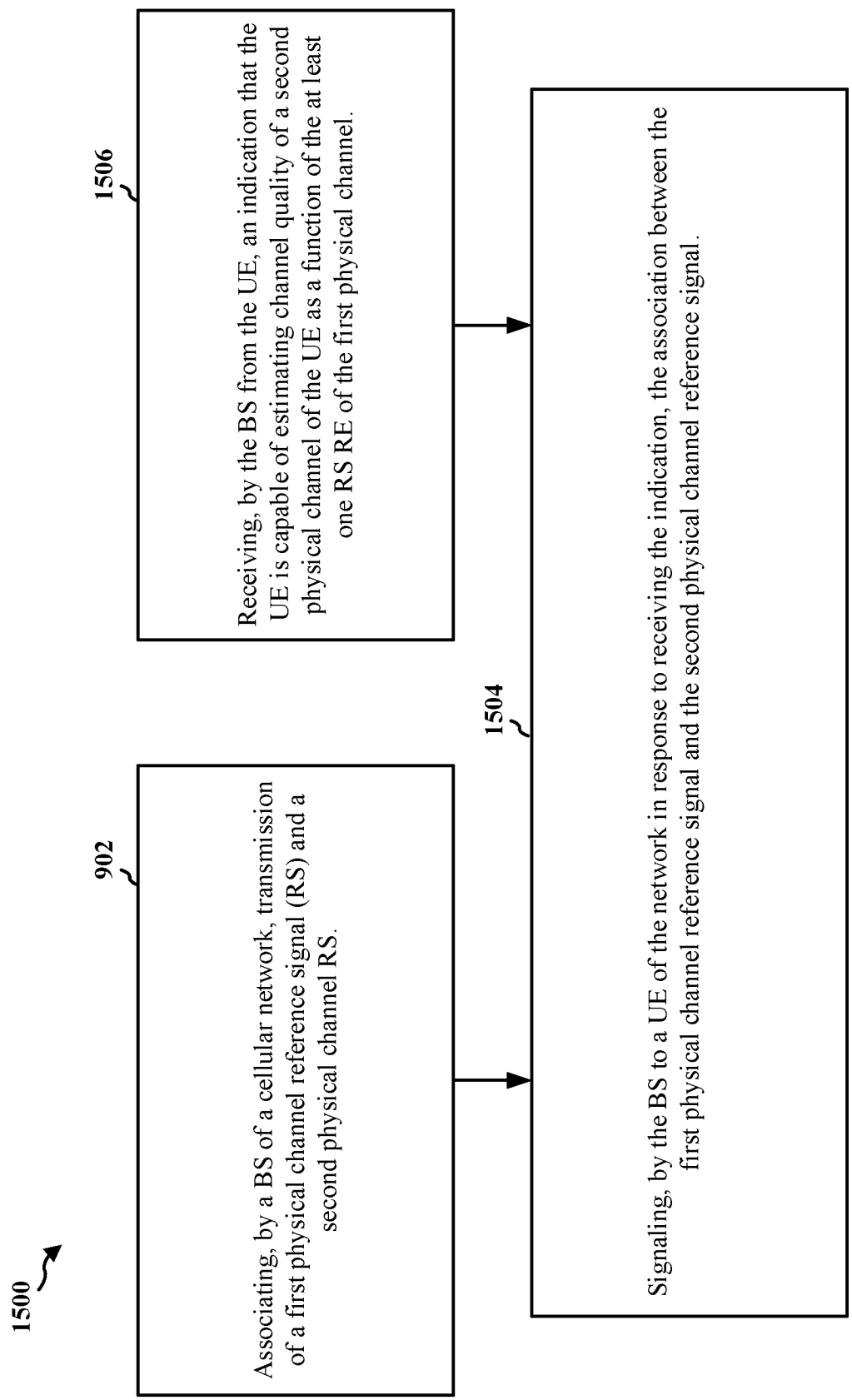
FIG. 15 is a flowchart of a method of wireless communication in accordance with example of the technology disclosed herein.

Referring to FIG. 15, and continuing to refer to prior figures for context, a flowchart of a method 1500 of wireless communication is shown, in accordance with examples of the technology disclosed herein from the perspective of a transmitter of the downlink. In such methods 1500, Block 902 is performed as described above. In such methods 1500, the base station receives, from a UE, an indication that the UE is capable of estimating channel quality of a second physical channel of the UE as a function of the at least one RS RE of the first physical channel—Block 1506. In response to this indication (and after associating as per Block 902), the base station then signals, to the UE, the association between the first physical channel reference signal and the second physical channel reference signal—Block 1504.

In the continuing example, the base station RX processor received an indication from the UE 350 that the UE was capable of exploiting channel pairing in the service of providing more relevant reference signals for the UE to use in demodulation of PDSCH user data. The base station TX processor 316, in response to the base station receiving the indication, and in response to associating the channels, caused the base station to signal the association to the UE.

In some examples, the UE Indication Component 382 is operative to receive, from the UE 350, an indication that the UE 350 is capable of estimating channel quality of a second physical channel of the UE 350 as a function of the at least one RS RE of the first physical channel. Accordingly, UE Indication Component 382 may provide means for receiving, from the UE 350, an indication that the UE 350 is capable of estimating channel quality of a second physical channel of the UE 350 as a function of the at least one RS RE of the first physical channel.

The indication, parameterization, and signaling options described herein for physical channel association at the base station to facilitate and signal the availability of cross-channel reference signals for use in estimating channel quality at a UE are exemplary, and not exclusive. For example, in the absence of an explicit signal, the UE may expect a default port pairing for certain channels under certain conditions. The signaling may include information useful for joint channel estimation. E.g., if PDCCH and PDSCH are transmitted at different power level, this power difference may be explicitly communicated to the UE. UE may then factor this information while estimating the channel.

In 5G NR wireless communications networks, a user equipment (UE) may use reference signals (RSs) in a given downlink physical channel from a network base station to characterize that physical channel. The UE may then use such characterizations, known as "channel estimation" or "channel response," to assist in demodulating information contained in that physical channel. Additional RSs within a given physical channel, while helpful in improving the quality of the channel estimation (and consequently assisting in reliably decoding the information contained in the channel) introduce overhead and reduce the symbols available for data transmission.

In aspects of the present disclosure, methods, non-transitory computer readable media, and apparatuses are provided. In some examples of the technology disclosed herein, a UE (a receiving apparatus in the downlink) and a base station (a transmitting apparatus in the downlink) may cooperate to enable the UE to use a reference signal of a first downlink physical channel to estimate the channel quality of a second downlink physical channel. The base station may configure the first channel and second channel to support such use, and may signal to the UE that the first channel supports such use. The configuration may be in response to the UE signaling that is capable of such use. The UE may use the resulting channel quality estimate to demodulate information on the second channel under challenging conditions, for example, low signal-to-noise ratio on the second channel, without the introduction of an additional reference signal in the second channel.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving, by a user equipment (UE) from a base station (BS), at least one resource block (RB), the RB comprising at least one reference signal (RS) resource element (RE) of a first physical channel of the UE;
   receiving, by the UE, an indication that transmission similarity between a port used to transmit the first physical channel and a port used to transmit a second physical channel supports estimating a channel quality of the second physical channel as a function of the at least one RS RE of the first physical channel; and
   estimating, by the UE, the channel quality of the second physical channel of the UE as a function of the at least one RS RE of the first physical channel in response to receiving the indication.

2. The method of claim 1, wherein the indication is received from the BS via at least one of Download Control Information (DCI), Media Access Control-Control Element (MAC-CE), or Radio Resource Control (RRC).

3. The method of claim 1, wherein the indication comprises identification of specific BS ports that are paired, and a duration of the port pairing.

4. The method of claim 1, wherein the first physical channel and the second physical channel are RB-contiguous in at least one of time and frequency.

5. The method of claim 1, further comprising, demodulating, by the UE, user data carried by the second physical channel as a function of the estimated channel quality.

6. The method of claim 1, wherein:
   the first physical channel is a Physical Downlink Control Channel (PDCCH), and the second physical channel is a Physical Downlink Shared Channel (PDSCH); and
   the reference signal of the first physical channel is a PDCCH DeModulation Reference Signal (DM-RS).

7. The method of claim 1, further comprising:
   prior to receiving the indication, signaling, by the UE to the BS, that the UE is capable of estimating channel quality of a second physical channel of the UE as a function of the at least one RS RE of the first physical channel; and
   wherein receiving the indication is in response to the signaling.

8. A method of wireless communication, comprising:
   associating, by a base station (BS), transmission of a reference signal (RS) of a first physical channel and an RS of, wherein the RS of the first physical channel comprises at least one RS resource element (RE); and
   signaling, by the BS to a user equipment (UE), an indication that transmission similarity between a port used to transmit the first physical channel and a port used to transmit the second physical channel supports estimating a channel quality of the second physical channel a function of the RS RE of the first physical channel.

9. The method of claim 8, wherein the associating comprises:
   configuring, by the BS, the first physical channel and the second physical channel as RB-contiguous in at least one of time and frequency.

10. The method of claim 8, wherein the associating comprises:
    configuring, by the BS, the first physical channel and the second physical channel to transmit over ports with substantially equal transmission beams and power levels.

11. The method of claim 8, wherein signaling the indication comprises signaling a duration of a pairing between the port used to transmit the RS of the first physical channel and the port used to transmit the RS of the second physical channel.

12. The method of claim 8, wherein signaling the indication comprises signaling an identification of a BS transmission port of the RS of the first physical channel and a BS transmission port of the RS of the second physical channel.

13. The method of claim 8, wherein the signaling of the association comprises signaling via at least one of Download Control Information (DCI), Media Access Control-Control Element (MAC-CE), or Radio Resource Control (RRC).

14. The method of claim 8, wherein:
    the first physical channel is a Physical Downlink Control Channel (PDCCH), and the second physical channel is Physical Downlink Shared Channel (PDSCH); and
    the RS of the first physical channel is a PDCCH DeModulation Reference Signal (DM-RS).

15. The method of claim 8, wherein:
    further comprising, prior to the signaling, receiving, by the BS from the UE, an indication that the UE is capable of estimating channel quality of a second physical channel of the UE as a function of at least one RS RE of the first physical channel; and
    wherein the signaling is in response to the receiving.

16. An apparatus for wireless communication, comprising:
    memory; and
    at least one processor coupled to the memory and configured to:
       receive, from a base station (BS), at least one resource block (RB), the RB comprising at least one reference signal (RS) resource element (RE) of a first physical channel of the apparatus;
       receive, from the BS, an indication that transmission similarity between a port used to transmit the first physical channel and a port used to transmit a second physical channel supports estimating a channel quality of the second physical channel as a function of the at least one RS RE of the first physical channel; and
       estimate the channel quality of the second physical channel of the apparatus as a function of the at least one RS RE of the first physical channel in response to receipt of the indication.

17. The apparatus of claim 16, wherein the indication is received from the BS via at least one of Download Control Information (DCI), Media Access Control-Control Element (MAC-CE), or Radio Resource Control (RRC).

18. The apparatus of claim 16, wherein the indication comprises identification of specific BS ports that are paired, and a duration of the port pairing.

19. The apparatus of claim 16, wherein the first physical channel and the second physical channel are RB-contiguous in at least one of time and frequency.

20. The apparatus of claim 16, wherein the at least one processor is further configured to demodulate user data carried by the second physical channel as a function of the estimated channel quality.

21. The apparatus of claim 16, wherein:
the first physical channel is a Physical Downlink Control Channel (PDCCH), and the second physical channel is a Physical Downlink Shared Channel (PDSCH); and
the reference signal of the first physical channel is a PDCCH DeModulation Reference Signal (DM-RS).

22. The apparatus of claim 16:
wherein the at least one processor is further configured to, prior to receipt of the indication, signal, to the BS, that the apparatus is capable of estimating channel quality of a second physical channel of the apparatus as a function of the at least one RS RE of the first physical channel; and
wherein the at least one processor is further configured to receive the indication in response to the signal that the apparatus is capable of estimating channel quality of the second physical channel of the apparatus as a function of the at least one RS RE of the first physical channel.

23. An apparatus of wireless communication, comprising:
memory; and
at least one processor coupled to the memory and configured to:
associate transmission of a reference signal (RS) of a first physical channel and an RS of, wherein the RS of the first physical channel comprises at least one RS resource element (RE); and
signal, to a user equipment (UE), an indication that transmission similarity between a port used to transmit the first physical channel and a port used to transmit the second physical channel supports estimating a channel quality of the second physical channel as a function of the RS RE of the first physical channel.

24. The apparatus of claim 23, wherein the at least one processor is configured to:
configure the first physical channel and the second physical channel as RB-contiguous in at least one of time and frequency.

25. The apparatus of claim 23, wherein the at least one processor is configured to:
configure the first physical channel and the second physical channel to transmit over ports with substantially equal transmission beams and power levels.

26. The apparatus of claim 23, wherein the at least one processor is configured to signal a duration of a pairing between the port used to transmit the RS of the first physical channel and the port used to transmit the RS of the second physical channel.

27. The apparatus of claim 23, wherein the at least one processor is configured to signal an identification of an apparatus transmission port of the RS of the first physical channel and an apparatus transmission port of the RS of the second physical channel.

28. The apparatus of claim 23, wherein signaling the association comprises signaling via at least one of Download Control Information (DCI), Media Access Control-Control Element (MAC-CE), or Radio Resource Control (RRC).

* * * * *